US012561192B2

(12) United States Patent
    Pinahs et al.

(10) Patent No.: US 12,561,192 B2
(45) Date of Patent: Feb. 24, 2026

(54) LEVERAGING HEALTH STATUSES OF DEPENDENCY INSTANCES TO ANALYZE OUTAGE ROOT CAUSE

(71) Applicant: Microsoft Technology Licensing, LLC, Redmond, WA (US)

(72) Inventors: Sarit Pinahs, Ramat Gan (IL); Izhak Mashiah, Qirya Ono (IL); Offek Anker, Raanana (IL); Liron Mid, Holon (IL); Yosef Asaf Levi, Tel Aviv (IL); Tamar Agmon, Ramat Gan (IL); Muhamed awad Mhameed, Zalafe (IL); Idan Agam, Tel Yitzhak (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 18/337,922

(22) Filed: Jun. 20, 2023

(65) Prior Publication Data

US 2024/0427658 A1   Dec. 26, 2024

(51) Int. Cl.
     *G06F 11/07*          (2006.01)
(52) U.S. Cl.
     CPC ........ *G06F 11/079* (2013.01); *G06F 11/0709* (2013.01)
(58) Field of Classification Search
     CPC ............................ G06F 11/0703; G06F 11/079
     See application file for complete search history.

(56) References Cited

U.S. PATENT DOCUMENTS

| | | | |
|---|---|---|---|
| 8,806,277 | B1 | 8/2014 | Mullangath |
| 11,240,127 | B1 * | 2/2022 | Hevenor ............. H04L 41/0681 |
| 2004/0049565 | A1 * | 3/2004 | Keller ................. G06F 11/0709 |
| | | | 714/E11.027 |
| 2015/0195157 | A1 * | 7/2015 | Nayyar ............... H04L 41/0681 |
| | | | 709/224 |
| 2019/0327154 | A1 * | 10/2019 | Sahoo ................... H04L 43/045 |
| 2020/0409715 | A1 | 12/2020 | Balasubramanian |

(Continued)

FOREIGN PATENT DOCUMENTS

| | | | | |
|---|---|---|---|---|
| CN | 113900663 | A | * | 1/2022 |
| EP | 3367242 | A1 | * | 8/2018 .......... G06F 11/1487 |

OTHER PUBLICATIONS

International Search Report and Written Opinion received for PCT Application No. PCT/US2024/033477, Oct. 18, 2024, 17 pages.

(Continued)

*Primary Examiner* — Joseph O Schell

(57) ABSTRACT

Examples of the present disclosure describe systems and methods determining a root cause of an outage of a dependent service. A method includes detecting an outage of a dependent service, determining a first service dependency of the dependent service, and identifying one or more instances of the first service dependency by accessing a service provider of the first service dependency. The method also includes collecting one or more service level indicators (SLIs) for one or more instances of the first service dependency and determining a health status of the instances of the first service dependency using the SLIs. The method further includes determining a root cause for the outage of the dependent service based on the health status of the instances of the first service dependency.

20 Claims, 8 Drawing Sheets

(56) References Cited

U.S. PATENT DOCUMENTS

| | | | |
|---|---|---|---|
| 2021/0133015 A1* | 5/2021 | Agarwal ............. | G06F 16/2455 |
| 2024/0028413 A1* | 1/2024 | Bhargava .............. | G06F 9/5066 |
| 2024/0427693 A1* | 12/2024 | Balasubramanian .. | G06N 20/00 |

OTHER PUBLICATIONS

International Preliminary Report On Patentability received for PCT Application No. PCT/US2024/033477, mailed on Jan. 2, 2026, 10 pages.

* cited by examiner

SERVICE B
UNHEALTHY

INPUT PARAMETERS

DETAILS

POSSIBLE RELATED OUTAGES

LEVERAGING HEALTH STATUSES OF DEPENDENCY INSTANCES TO ANALYZE OUTAGE ROOT CAUSE

BACKGROUND

A cloud computing platform is used to build, deploy, and manage services and resources. Cloud services of a cloud computing platform are often subject to one or more distributed computing models, where various cloud resources perform specific functions or provide specific capabilities. Dependencies between a cloud service and various cloud resources exist when the service utilizes the various resources to support the service to function effectively. Thus, the service is a dependent service of the cloud resources, and the cloud resources are service dependencies of the dependent service. Service owners in cloud computing often define thousands of metrics for monitoring their dependent service and service dependency health. However, even with metrics for monitoring services, finding a root cause of a service outage can be difficult and time consuming.

It is with respect to these and other considerations that examples have been made. In addition, although relatively specific problems have been discussed, it should be understood that the examples should not be limited to solving the specific problems identified in the background.

SUMMARY

Examples of the present disclosure describe systems and methods for determining a root cause of an outage of a dependent service. In aspects, a method includes detecting an outage of a dependent service and determining service dependencies on which the dependent service relies. Further, the method includes identifying instances of the service dependencies and service level indicators (SLIs) for the instances. The SLIs are used to determine a health status of the instances. Further, the method determines an analysis of a root cause for the outage of the dependent service based on the health statuses of the instances of the service dependencies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
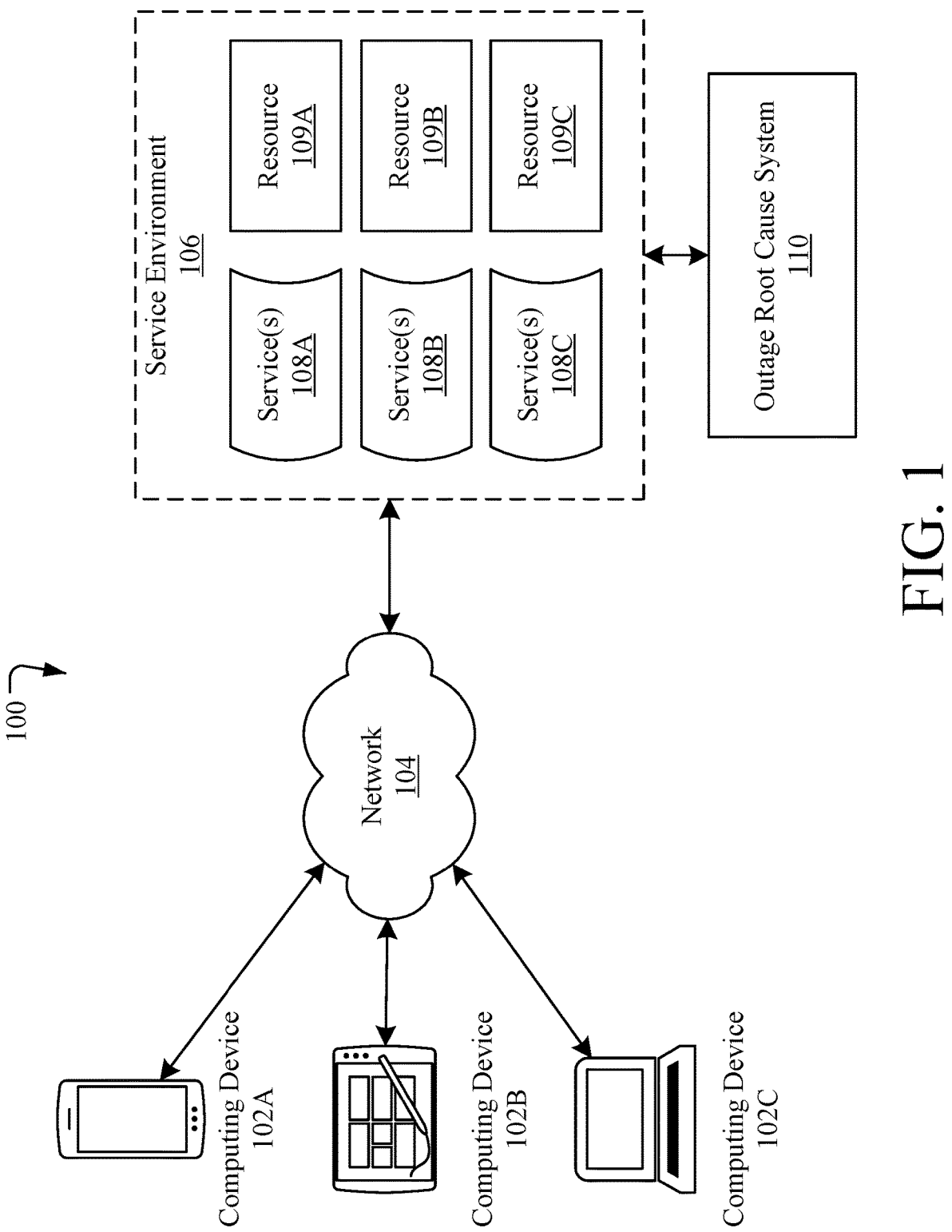
FIG. 1 is a block diagram illustrating an overview of an example system for leveraging the health statuses of service dependency instances to analyze a root cause of a service outage according to one or more aspects of the present disclosure.

Typically, operating environments (e.g., computing systems and platforms) implement multiple services and resources that facilitate the performance of various tasks. A service, as used herein, includes functionality such as software services and hosted applications. A software service refers to software functionality that performs automated tasks, such as responding to hardware events or listening for data requests from other software. A software service is typically managed for users (e.g., by an administrator) and is primarily accessed by other software, as opposed to primarily being accessed by users. A hosted application is software that is running on remote infrastructure (e.g., a cloud provider's server) that can be accessed over the internet via a web-based user interface. A resource refers to any hardware or software components or features that are accessible by services via a computing system, such as memory, processing power, storage, applications (e.g., native applications or hosted applications), or virtual devices.

Many activities (e.g., tasks, projects, data requests) in an operating environment must be completed using multiple services and resources. For example, in many cases, a dependent service relies on multiple service dependencies to perform its functions. A dependent service refers to a service or resource that relies on (e.g., is dependent on) one or more other services or resources to perform a task. A service dependency refers to a service or resource on which a dependent service relies (e.g., depends on) to perform a task. Commonly, services used in an operating environment are developed and/or maintained by different entities (e.g., users, teams, organizations). These entities may have different methods and standards of measuring the performance of their respective services. Further, these entities may not know which services (e.g., service dependencies) are used by other services (e.g., dependent services).

In operating environments, especially cloud computing environments, reliability and availability are particularly important. To ensure reliability and availability, administrators attempt to minimize the time to identify and mitigate any outages in the operating environment. An outage refers to any type of failure, performance degradation, or other undesirable condition that results in a service, resource, application, or other software or hardware component not performing as intended for a period of time. However, while identifying an outage of a service or resource may not take much time, identifying the root cause of the outage may be much more time consuming. For example, an outage of a dependent service may be due to an issue in a service dependency, or an issue in a specific instance of a service dependency. An instance refers to an occurrence of an object (e.g., a software program, service, or framework) having a particular object state. For example, multiple users may execute respective instances of a single software program, where each instance is controlled by and/or accessible to a respective user. Each instance may represent the state (e.g., condition of stored inputs and variables) of the software program, service, or framework at a particular time.

Examples of the present disclosure provide a solution to the above-described challenges with detecting outages in services and resources. Embodiments of the present disclosure describe systems and methods for leveraging the health statuses of service dependency instances to determine a root cause of a dependent service outage. For instance, an outage root cause system analyzes an outage of a dependent service to determine the root cause by identifying service dependencies of the dependent service, identifying instances of the service dependencies ("service dependency instances"), identifying one or more service level indicators (SLIs) for one or more of the service dependency instances, and determining a health status of the service dependency instances using the SLIs. The outage root cause system further determines one or more possible root causes for the outage of the dependent service based on the health status of the service dependency instances. The possible root causes are provided to one or more applications, services, data stores, or systems. For instance, the possible root causes may be included in a report and presented (e.g., via a graphical user interface (GUI)).

The example systems and methods described herein include many advantages over previous outage detection solutions, such as providing an increased granularity in determining a root cause of a dependent service outage by determining a health status of service dependency instances and using SLIs of the service dependencies instances to detect issues (e.g., with dependent services and service dependencies) that are not detectable using the previous outage detection solutions.

FIG. 1 illustrates an example system 100 for leveraging the health statuses of service dependency instances to determine a root cause of a dependent service outage. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, components of systems disclosed herein are implemented on a single processing device. The processing device may provide an operating environment for software components to execute and utilize resources or facilities of such a system. In another example, the components of systems disclosed herein are distributed across multiple processing devices. For instance, input may be entered on a user device or client device and information is processed on or accessed from other devices in a network, such as one or more remote cloud devices or web server devices.

In FIG. 1, system 100 comprises user devices 102A, 102B, and 102C (collectively "user device(s) 102"), network 104, service environment 106, and outage root cause system 110. Service environment 106 comprises service(s) 108A, 108B, and 108C (collectively "service(s) 108") and resources 109A, 109B, and 109C (collectively "resource(s) 109"). Although FIG. 1 is depicted as comprising a particular combination of computing environments and devices, the scale and structure of systems such as system 100 may vary and may include additional or fewer components than those described in FIG. 1. As one example, system 100 may comprise or have access to multiple service environments 106. As yet another example, user device(s) 102 may comprise or locally access one or more of service(s) 108 or resource(s) 109. Further, although examples in FIG. 1 and subsequent figures will be described in the context of leveraging the health statuses of service dependency instances and analyzing root causes of outages, the examples are equally applicable to leveraging other types of information for dependencies and dependency instances and to analyzing other types of service-impacting events (e.g., service performance degradation, network degradation, behavioral anomalies).

User device(s) 102 detect and/or collect input data from one or more users or devices. In some examples, the input data corresponds to user interaction with one or more software applications or services implemented by, or accessible to, user device(s) 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. The input data includes, for example, voice input, touch input, text-based input, gesture input, video input, and/or image input. The input data is detected/collected using one or more sensor components of user device(s) 102. Examples of sensors include microphones, touch-based sensors, geolocation sensors, accelerometers, optical/magnetic sensors, gyroscopes, keyboards, and pointing/selection tools. Examples of user device(s) 102 include personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices.

User device(s) 102 transmit information associated with the collected input data as one or more payloads. A payload may comprise data corresponding to an event, an entity, a transaction, or other information associated with an activity. As one example, a payload comprises an entity identifier, event information (e.g., an event identifier, documents or document content, location information, date/time information, participant information, a set of conditions for triggering the event, a rule set for executing the event), and/or transaction information (e.g., the object or content of the transaction, identification of services, applications, and/or systems used in the transaction, a rule set for conducting the transaction). User device(s) 102 transmit the payloads to and receive response data from service environment 106 using network 104. Examples of network 104 may include a private area network (PAN), a local area network (LAN), a wide area network (WAN), and the like. Although network 104 is depicted as a single network, it is contemplated that network 104 may represent several networks of similar or varying types.

Service environment 106 provides access to various computing services (e.g., service(s) 108) and resources (e.g., resource(s) 109) over one or more networks, such as network 104. Service environment 106 may be implemented in a cloud-based or server-based environment using one or more computing devices, such as server devices (e.g., web servers, file servers, application servers, database servers). Service environment 106 comprises one or more hardware and/or software components and may be subject to one or more distributed computing models (e.g., Infrastructure as a Service (IaaS), Platform as a Service (PaaS), Software as a Service (SaaS), Functions as a Service (FaaS)).

In implementations, service(s) 108 and resource(s) 109 are integrated into (e.g., hosted by or installed in) service environment 106. Alternatively, one or more of service(s) 108 or resource(s) 109 are implemented externally to and expose functionality to service environment 106. In examples, two or more of service(s) 108 and/or resource(s) 109 are used to form a service pipeline for processing payloads received from user device(s) 102. A service pipeline refers to a configuration of services and/or resource(s) in which the output (or a subset of the output) of one service is provided as the input to another service. Each service in the service pipeline may process received payloads, transmit processed payloads to downstream (e.g., subsequent) services or resources of the service pipeline, and emit metrics data relating to processed payloads.

In some examples, processing the payloads comprises relying on one or more dependencies of service(s) 108. Dependencies of service(s) 108 exist when a service utilizes another service or resource to function effectively. As one example, a network monitoring service (e.g., a dependent service) may rely on an event analysis service (e.g., a service dependency of the dependent service) to classify network activity detected by the network monitoring service. In this example, the network monitoring service may invoke (e.g., call) the event analysis service in response to detecting potentially anomalous network activity. The event analysis service may evaluate the network activity and provide results of the evaluation to the network monitoring service. As another example, the network monitoring service (e.g., a dependent service) may rely on an access control list (ACL) or user access database (e.g., a service dependency of the dependent service) to control user access to other services and resources. In this example, the network monitoring service may access the ACL or user access database to determine whether a user is authorized to access a service or resource.

Outage root cause system 110 evaluates service outages experienced by service(s) 108. As will be discussed in more detail below with respect to FIG. 3, outage root cause system 110 comprises multiple components that collectively provide for detecting service outages, determining service dependencies, identifying individual service dependency instances, identifying SLIs for service dependency instances, determining health statuses for the service dependency instances, determining possible root causes for the service outages, and reporting the possible root causes. In some examples, the outage root cause system 110 is implemented within service environment 106, which may enable outage root cause system 110 to communicate directly with service(s) 108. In other examples, the outage root cause system 110 is implemented externally to service environment 106, such as in a separate service environment or cloud computing system. In such an example, although outage root cause system 110 is able to communicate with one or more data repositories storing information relating to the service(s) 108, outage root cause system 110 may not be able to access or communicate with service(s) 108.

Figure 2A:
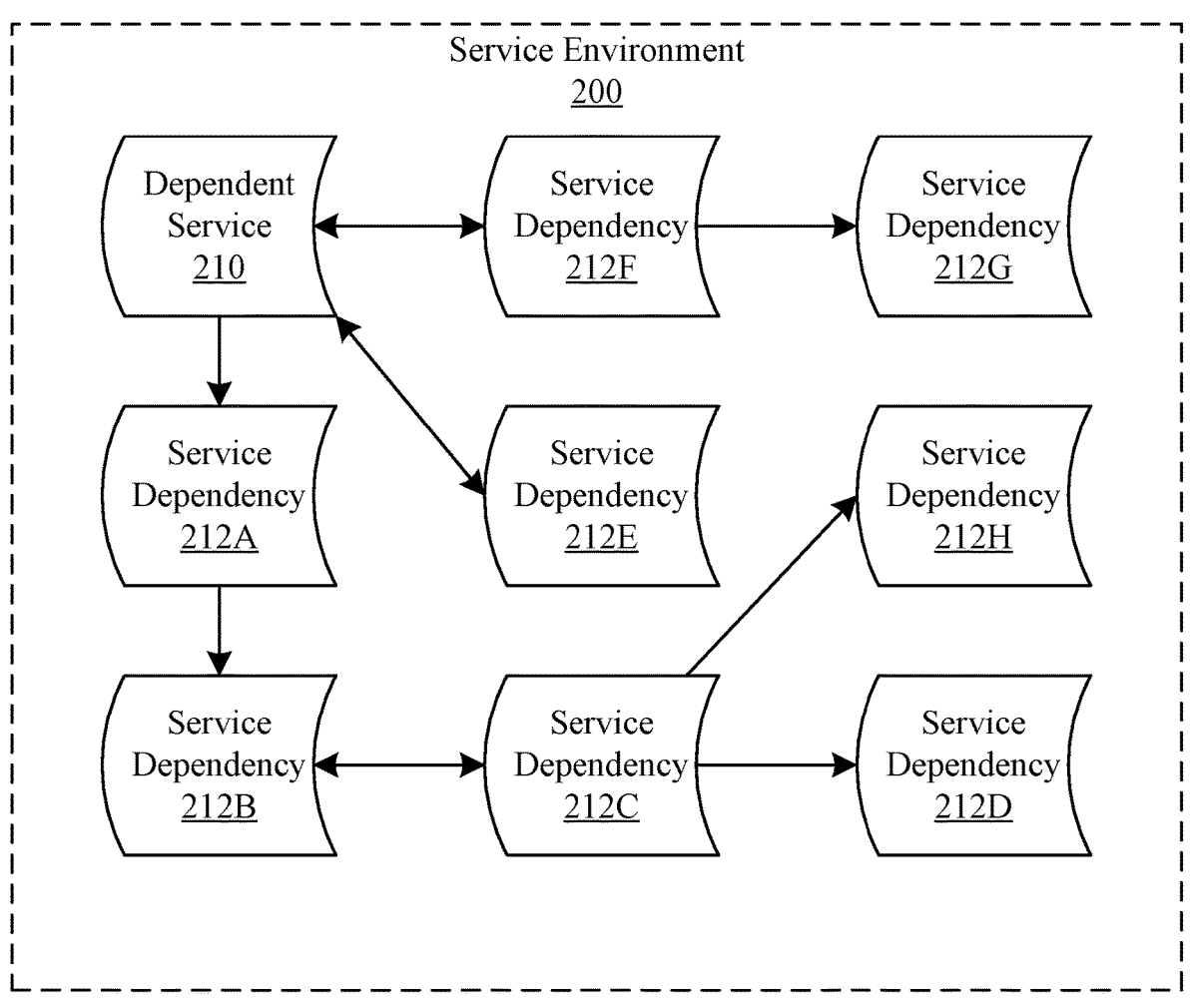
FIG. 2A is a schematic block diagram illustrating various services within a service environment including a dependent service and one or more service dependencies according to one or more aspects of the present disclosure.

FIG. 2A is a schematic block diagram illustrating various services within a service environment including a dependent service and multiple service dependencies. In the illustrated example of FIG. 2A, the service environment 200 includes a dependent service 210 and a plurality of service dependencies 212A, 212B, 212C, 212D, 212E, 212F, 212G, and 212H (collectively "service dependencies 212"). The service dependencies 212 may be direct or indirect dependencies of the dependent service 210. For example, service dependency 212A, 212E, and 212F are direct dependencies of dependent service 210, while service dependencies 212B, 212C, 212D, 212G, and 212H are indirect dependencies of the dependent service 210. By being dependencies of the dependent service 210, the service dependencies 212 provide functionality to the dependent service 210 to enable the dependent service 210 to perform tasks (e.g., retrieve data, store data, schedule an event). Additionally, in some examples, the service dependencies 212 are both dependencies of and dependent on one or more other service dependencies 212 and/or the dependent service 210. For example, service dependencies 212E and 212F are service dependencies of the dependent service 210, and the dependent service 210 is a service dependency of the service dependencies 212E and 212F. As a service dependency of the service dependencies 212E and 212F, the dependent service 210 provides functionality that enables the service dependencies 212E and 212F to perform their respective tasks. The dependent service 210 may be associated with any number of direct or indirect service dependencies 212 and each service dependency 212 may be dependent on any number of other service dependencies 212 or dependent services 210.

Figure 2B:
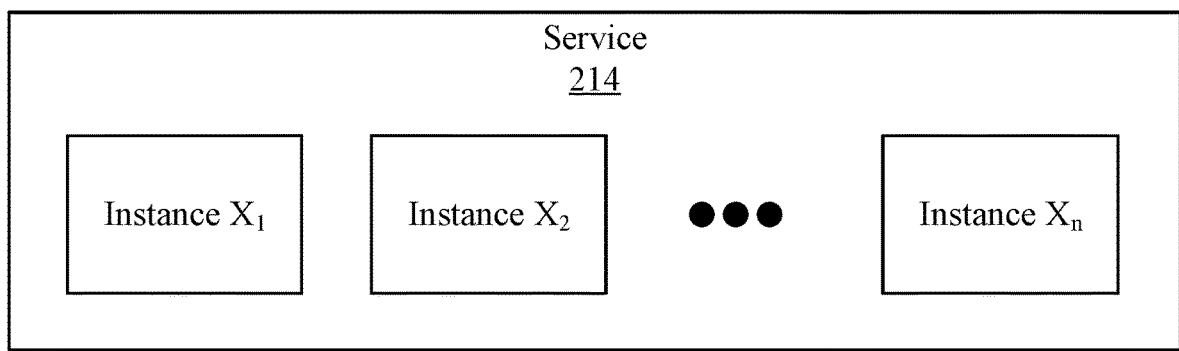
FIG. 2B is a schematic block diagram illustrating various instances within a service according to one or more aspects of the present disclosure.

FIG. 2B is a schematic block diagram illustrating various instances within a service. the example service 214 may be a dependent service, such as dependent service 210, or a service dependency, such as service dependencies 212. The service 214 provides one or more instances of the service 214. For example, each of multiple users may execute a separate instance of the service 214. Alternatively, a single user may execute multiple instances of the service 214. In some examples, each instance of the service 214 provides the complete functionality of the service 214. In other examples, one or more instances of the service 214 provides a subset of the functionality of the service 214. For instance, the functionality of an instance may be limited based on attributes of a user associated with the instance (e.g., user role, group affiliation, user privileges) or attributes of a computing environment associated with the instance (e.g., computing device capabilities or geographical data constraints). The instances of the service 214 may be controlled collectively by the service 214. The service 214 may limit access and/or control of each instance to the user associated with each instance. In examples, each instance is located in a region corresponding to a geographical location or area in which the instance is executing. Each region includes its own set of servers and infrastructure to handle the operations of the service instance.

Figure 3:
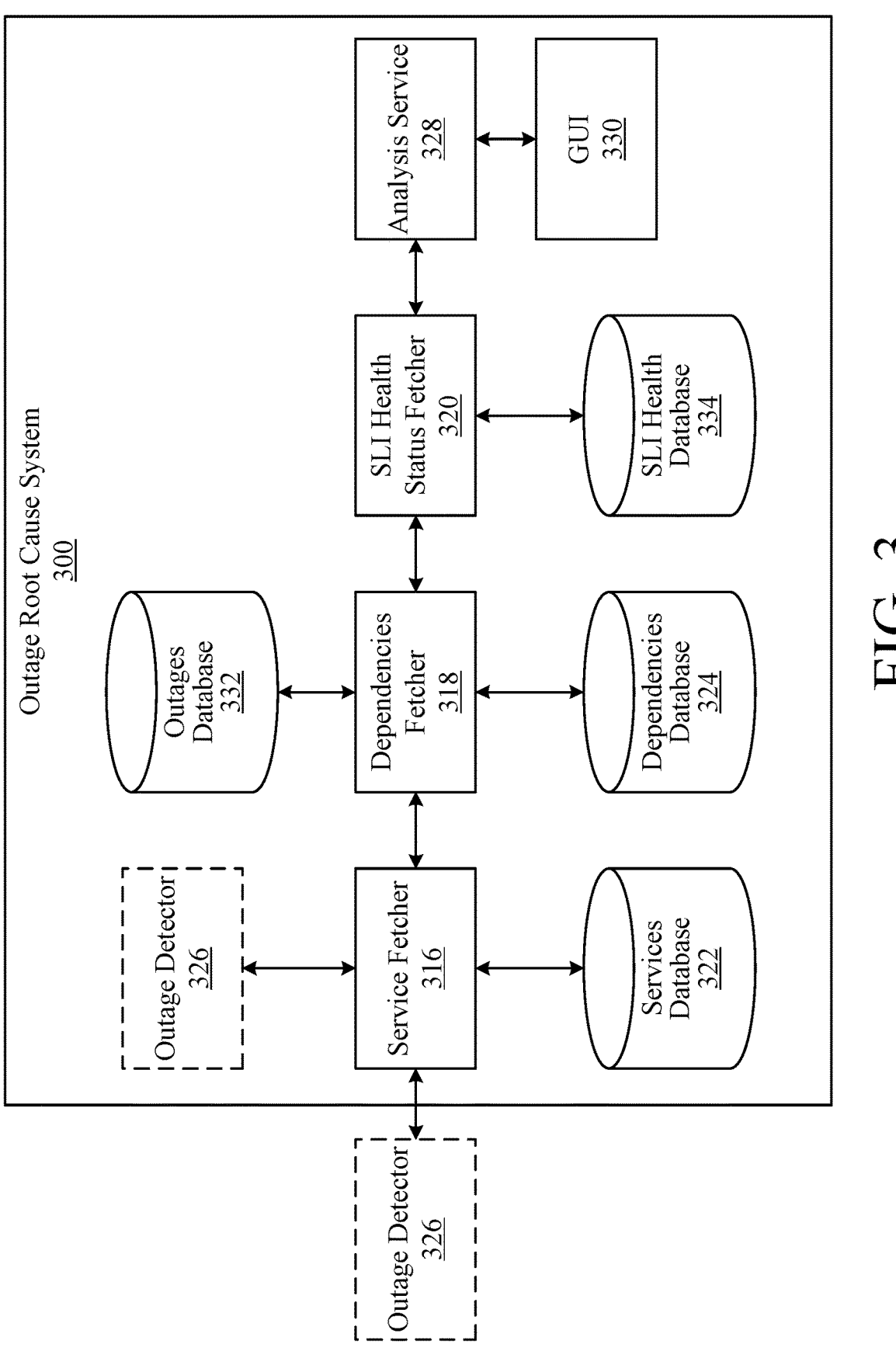
FIG. 3 is a schematic block diagram illustrating components of an example outage root cause system according to one or more aspects of the present disclosure.

FIG. 3 is a schematic block diagram illustrating components of an example outage root cause system for implementing methods described herein. In examples, the outage root cause system 300 is implemented within a service environment, such as service environment 106 or a service environment having access to service environment 106. The outage root cause system 300 is able to communicate with services implemented within the service environment, such as service(s) 108, in addition to being able to communicate with services implemented externally to the service environment. The outage root cause system 300 includes a service fetcher 316, a dependencies fetcher 318, an SLI health status fetcher 320, a services database 322, a dependencies database 324, an analysis service 328, a GUI 330, an outages database 332, and an SLI health database 334. The outage root cause system 300 may also be is associated with an outage detector 326 that is further included in the outage root cause system 300 or is implemented externally to the outage root cause system 300.

In examples, the outage detector 326 is used to determine if a service experiences an outage. For example, the outage detector 326 detects that a service is not operating as desired (e.g., below a service level threshold or is offline). If an outage is detected, the outage detector 326 communicates the outage to the service fetcher 316. The service fetcher 316 communicates with the services database 322 to identify which service is experiencing the outage. The services database 322 stores information relating to services and/or service dependency instances of services, such as identities of each service or instance, and metrics for each service or instance (e.g., memory metrics, central processing unit (CPU) metrics, response duration metrics, availability metrics). In some examples, the service fetcher 316 obtains a unique identifier of the service experiencing the outage. The unique identifier is passed to the dependencies fetcher 318.

Based on the unique identifier, the dependencies fetcher 318 determines one or more service dependencies of the service experiencing the outage (e.g., the dependent service) using any suitable method(s). In some examples, the dependencies fetcher 318 determines dependencies of the dependent service using a multi-stage methodology, where a first stage of the methodology is performed prior to the detected outage (e.g., in an offline process) and a second stage of the methodology is performed when the outage is detected (e.g., in real time or near real time). In other implementations, the dependencies fetcher 318 performs the first stage upon detecting the service is experiencing an outage. In the first stage, the dependencies fetcher 318 uses one or more methods to determine service dependencies of a service. In one method, the dependencies fetcher 318 identifies a list of self-reported dependencies from the services in the service environment. The services periodically provide their service dependencies as part of an automated data collection process. Alternatively, the dependencies fetcher 318 queries one or more services in response to a detected outage, and the services responsively report their service dependencies to the dependencies fetcher 318. Information relating to service dependencies between the services in the service environment are stored in the dependencies database 324. For example, dependencies database 324 stores relationships (e.g., dependency relationships) between dependent services and service dependencies, relationships between dependent services, and/or relationships between service dependencies. The dependencies database 324 may also store additional information, such as a date/time a dependency was recorded, an identity of each service/instance, and a collection method used to identify the relationships.

In another method, in addition to or in lieu of collecting self-reported dependencies, the dependencies fetcher 318 performs a scream test to determine service dependencies of the service. A scream test refers to a scenario in which the reaction to the removal of a feature, service, or application is evaluated based on the level of feedback received in response to the removal. For instance, a scream test may be performed by disabling a first service for a time interval and monitoring user feedback (e.g., user reports of impacted services) and other services for issues (e.g., impacted service or network performance) or notifications (e.g., warnings or alerts) associated with disabling the first service. Any service that no longer operates as expected during (or subsequent to) the time interval due to the first service being disabled is determined to be a dependent service of the first service (e.g., the service dependency). In some examples, the scream test further includes reenabling the disabled service after the time interval. Reenabling the service dependency enables additional testing regarding whether the users and dependent services ceased experiencing issues after the service dependency was reenabled. For instance, if a dependent service ceased experiencing issues after the service dependency was reenabled, the dependencies fetcher 318 may assign a corresponding confidence score (e.g., indicating a high probability of accuracy) to a determined dependency. Upon determining the dependent services of a service dependency using the scream test, the dependencies fetcher 318 stores information relating to service dependencies in the dependencies database 324.

In some examples, additional scream tests may be performed on one or more dependent services determined by a previous scream test to further determine dependent services of the determined dependent services. For example, a dependent service may depend on one or more other dependent services to operate. The dependencies fetcher 318 further stores the additional information relating to service dependencies for determined dependent services in the dependencies database 324.

In another method, the dependencies fetcher 318 identifies a deployment of a service (e.g., a dependent service) and analyzes the deployed service to identify its service dependencies. For instance, the dependencies fetcher 318 may evaluate the deployed service's configuration, codebase, integrations, etc., to determine the service dependencies. The evaluation may include identifying code libraries, frameworks, or other software resources that are explicitly defined or referenced in configuration information (e.g., source code, development documentation, configuration files, and/or installation logs). Upon determining the service dependencies of the deployed dependent service, the dependencies fetcher 318 stores information relating to the deployed dependent service and its service dependencies in the dependencies database 324.

In another method, the dependencies fetcher 318 queries an outages database 332 for outage relationship information. For instance, the outages database 332 stores information relating to outages and other service-impacting events of various services of the service environment. In examples, the outages database 332 also includes information identifying a user or a service owner associated with a service that experienced an outage. The dependencies fetcher 318 evaluates the information in the outages database 332 to determine associations between the services impacted by one or more outages. As one example, the information in the outages database 332 may indicate that an outage caused a service impact to multiple services. The information in the outages database 332 may explicitly identity that two or more of the multiple services share a dependency. Alternatively, the dependencies fetcher 318 may infer a shared dependency between two or more of the multiple services based on, for example, the contemporaneous occurrence of the service impacts to the multiple services. As another example, the information in the outages database 332 may indicate that a first outage impacted a first service and a second outage impacted a second service. The dependencies fetcher 318 may determine that the first outage caused or significantly contributed to the second outage based on the sequential occurrence of the first and second outages, the type of errors received by the first or second services, or the data (or type of data) received by the first or second services. Upon determining the associations between the services impacted by the outages, the dependencies fetcher 318 stores the determined associations as dependencies in the dependencies database 324.

In another method, the dependencies fetcher 318 evaluates communications by or between one or more entities (e.g., service owners, administrators, users) associated with the services of the service environment. As one example, a first entity (e.g., a data or task requestor, or the service owner) associated with a dependent service that has experienced an outage contacts a second entity (e.g., an administrator or a service helpdesk) to report the outage. The second entity may notify the first entity of an issue impacting one or more service dependencies of the dependent service. In another example, the first entity contacts a second entity that is an owner of the service dependency that caused the dependent service to experience the outage. In either example, the dependencies fetcher 318 determines the communications between the first and second entities indicate a dependency relationship between the dependent service and the service dependency. For instance, the dependencies fetcher 318 may use language analysis techniques, such as natural language processing (NLP), to process communications (e.g., identify terms in and intents of speech). The processed communications are then used to determine dependencies.

In some examples, a frequency of communication between the entities is also or alternatively evaluated to determine dependencies. For instance, the dependencies fetcher 318 may access a communication log (e.g., a call history, an email chain, a chat log) that comprises communications between multiple entities, including a first owner of a dependent service and a second owner of a service dependency of the dependent service. By analyzing communications between the first owner and the second owner, the dependencies fetcher 318 determines a dependency between the dependent service and the service dependency. For instance, the dependencies fetcher 318 determine that the large number of communications between the first owner and the second owner indicates a high probability of a relationship between the dependent service and the service dependency. Upon determining dependencies based on communications between entities, the dependencies fetcher 318 stores the dependencies in the dependencies database 324.

In another method, the dependencies fetcher 318 identifies domain name system (DNS) communications (e.g., DNS requests) between services. The dependencies fetcher 318 analyzes the DNS communications to determine that one or more services are dependencies of another service. For example, the dependencies fetcher 318 identifies DNS requests from a first service to a second service. Based on the DNS requests, the dependencies fetcher 318 determines that the second service is a dependency of the first service. In at least one example, DNS requests between the first and second services indicate that the first and second services are service dependencies of each other (e.g., the first service in a service dependency of the second service and the second service is a service dependency of the first service). Upon determining dependencies using the DNS request, the dependencies fetcher 318 stores the dependencies in the dependencies database 324.

In some examples, the dependencies fetcher 318 further determines weights for dependency relationships stored in the dependencies database 324 and/or other determined dependencies. A dependency relationship between a dependent service and a service dependency may be weighted based on one or more dependency weighting factors. In an example implementation, the dependency weighting factors correspond to the methods used to determine the dependency relationship, where each method is assigned a particular weight or value. For example, a self-reported dependency may be assigned a score of 1.0 (on a scale of 0-1.0, where 1.0 is the highest value), a scream test dependency may be assigned a score of 0.7, a deployment dependency may be assigned a score of 0.9, an responsibility link dependency may be assigned a score of 0.5, a communication-based dependency may be assigned a score of 0.2, and/or a DNS dependency may be assigned a score of 0.6. In such an example, self-reported dependencies may be considered the most accurate dependency determinations based on the dependencies being explicitly reported by the service, whereas the communication-based dependencies (e.g., dependencies determined based on communications between entities) may be considered the least accurate dependency determinations (based on the difficulty of accurately determining user intent in communications.

In at least one example, a dependency relationship between a dependent service and a service dependency is weighted based on a number of dependency relationship determinations made using the above-discussed methods. For instance, if a dependent service is determined to have a dependency relationship with a first service dependency based on self-reported service dependencies, and the dependent service is determined to have a dependency relationship with a second service dependency based on self-reported service dependencies, scream test results, and DNS records, the dependency relationship between the dependent service and the second service dependency is weighted more heavily to indicate a stronger dependency relationship between the dependent service and the second service dependency. In some examples, the one or more dependency weighting factors are used to determine a likelihood a service dependency is a dependency of a dependent service. For instance, one or more weighting factors for a dependency relationship may be aggregated (e.g., summed or otherwise combined) and/or compared to a threshold value that is used to determine whether a dependency relationship is indicative of a service dependency.

In the second phase of the multi-stage methodology, the dependencies fetcher 318 fetches dependency relationship information of a dependent service experiencing an outage from the dependencies database 324. In an example implementation, the dependencies fetcher 318 fetches the dependency relationship information for the dependent service in response to receiving an indication of an outage of the dependent service. If a dependency relationship between the dependent service experiencing the outage and one or more service dependencies is stored, the dependencies fetcher 318 fetches information about the dependency relationship between the dependent service and the one or more service dependencies from the dependencies database 324.

After the dependencies fetcher 318 has retrieves the dependency relationship information of a service experiencing an outage (e.g., the dependent service), the dependencies fetcher 318 further identifies one or more service dependency instances of the service. In some examples, the dependencies fetcher 318 identifies service dependency instances by querying the respective service providers of the service dependencies. The service provider may provide a list of all known instances of the determined service dependencies. Alternatively, the service provider may provide a list that includes only the service dependency instances that are accessible to the dependent service. In other examples, the dependencies fetcher 318 identifies service dependency instances by querying the dependencies database 324. Additionally or alternatively, the dependencies fetcher 318 identifies service dependency instances by querying the services database 322.

In some examples, after service dependency instances have been identified, SLI health status fetcher 320 determines a health status of each service dependency instance using one or more SLIs. An SLI refers to a metric that is used to measure the level of service provided to a user (e.g., a customer) by a provider, such as a software service provider or a resource provider. One or more SLIs may form the basis of a service level agreement (SLA), which defines the level of service expected by the user from the provider. SLIs may include any type of information about each service dependency instance, such as instance availability, instance latency, instance success/error rate of data transmissions, instance throughput, instance data response time, and instance computing resource usage (e.g., CPU usage, memory usage, storage usage).

In some examples, an SLI includes one or more thresholds that are used to determine a health status of the service dependency instance. For example, an SLI relating to an availability of a service dependency instance may be associated with a threshold of 95 percent, where the instance is considered unhealthy if the instance is not available at least 95 percent of the time. In another example, an SLI relates to a response time of a service dependency to a request from a dependent service. The response time SLI includes thresholds of, for example, 10 milliseconds (ms) and 100 ms. If the service dependency instance responds to the request in less than 10 ms, the service dependency instance is considered healthy. If the service dependency instance responds to the request in between 10 ms and 100 ms (inclusive), the service dependency instance is considered moderately healthy or slightly unhealthy. If the service dependency instance response to the request is over 100 ms, the service dependency instance is considered unhealthy. In some examples, an SLI includes multiple thresholds corresponding to a healthiness percentage (e.g., 10% healthy, 20% healthy) associated with a service dependency instance. In at least one example, the SLIs for a service dependency instance and/or the thresholds for the SLIs are defined by a service owner and are configurable (e.g., by a service owner).

In some examples, the SLI health status fetcher 320 checks (e.g., periodically or continuously) dependent services and/or service dependency instances to determine if one or more service dependency instances are unhealthy. For example, the SLI health status fetcher 320 may check service dependency instance data and determine if a service dependency instance is unhealthy in real-time. Alternatively, in some examples, the SLI health status fetcher 320 periodically (e.g., every five seconds or once a minute) checks service dependency instances to determine if an instance of a service dependency and/or the service dependency is unhealthy.

In some examples, the SLI health status fetcher 320 communicates with an SLI heath database 334 and/or other information sources (e.g., a health monitoring service, an event detection system, or service and resource usage logs) to determine the health status of service dependency instances. The SLI health database 334 stores health statuses of services and service instances within or accessible to the service environment. The SLI health database 334 may be populated by SLI health status fetcher 320, the other information sources mentioned above, or directly by one or more services. The SLI health status fetcher 320 accesses instance and/or service information stored in the SLI heath database 334 in addition to dependency relationships between services stored in the dependencies database 324 to determine the health status of instances and/or services. In some examples, the SLI health status fetcher 320 stores information in the SLI heath database 334 and/or another database. For example, the SLI health status fetcher 320 may store health status information for various service dependency instances, times associated with the health status information, regions associated with the health status information, and other information about the service dependency instances and/or dependent services.

Based on a health status of the service dependency instances, an analysis of the root cause of the outage is performed. In the illustrated example of FIG. 3, an analysis service 328 analyzes the SLI health status information of the service dependency instances to determine the root cause of the dependent service outage. The analysis service 328 may communicate with the SLI health status fetcher 320, the services database 322, and/or the dependencies database 324 to obtain information about the dependent service or service dependency instances to perform the analysis and determine the root cause. The analysis service 328 may use the SLI health statuses of each service dependency and/or each service dependency instance to determine the root cause. For example, the analysis service 328 may determine a root cause of an outage is an issue with a specific instance of a service dependency. In another example, the analysis service 328 may determine a root cause of an outage is an issue that manifests in or is caused by a plurality of the service dependency instances.

In some examples, the analysis service 328 determines more than one possible root cause for an outage of a dependent service. As one example, a first service dependency and a second service dependency of the dependent service are both identified as unhealthy due to separate, unrelated issues occurring with the first and second service dependencies. The analysis service 328 may determine that both the first and second service dependencies are possible root causes of the outage. In another example, a first service dependency and a second service dependency having a dependency on the first service dependency (e.g., the first service dependency is a dependency of the second service dependency) are both identified as unhealthy due to an issue occurring with the first service dependency. As the issue occurring with the first service dependency also impacts the second service dependency, the analysis service 328 may determine that both the first and second service dependencies are possible root causes of the outage. In this example, the analysis service 328 may assign a confidence value to each of the first and second service dependencies based, at least in part, on the dependency between the first and second service dependencies. For instance, the analysis service 328 may indicate a 75% likelihood that the first service dependency is the root cause and a 25% likelihood that the second service dependency is the root cause. In some examples, the analysis service 328 ranks service dependencies or service dependency instances according to their respective likelihoods of being a root cause for an outage.

In some examples, to determine the root cause, the analysis service 328 compares a time interval of the outage of the dependent service with a tie interval associated with the SLI health statuses of service dependencies and/or service dependency instances. In further examples, the analysis service 328 compares a physical region of the dependent service and service dependency instances of the dependent service The time interval and/or region may be used to include or exclude service dependencies and/or service dependencies instances as possible root causes of an outage. For example, if a service dependency instance is unhealthy during the same time interval that a dependent service is experiencing an outage, the analysis service 328 determines the instance of the service dependency is a possible root cause for the outage of the dependent service. However, if the instance of the service dependency is located in a region that is physically separated by a threshold distance from a region in which the dependent service is located, the analysis service 328 may determine to exclude the service dependency instance as a possible root cause for the outage. In other examples, criteria other than time and region are used to include or exclude service dependencies and/or service dependency instances as possible root causes.

The analysis service 328 provides the possible root causes (and information associated therewith) to one or more applications, services, data stores, or systems. For instance, in one example, the analysis service 328 provides the possible root causes to an administrator or service owner of each of the dependent service experiencing the outage and the service dependencies impacted by the outage. In such an example, the analysis service 328 may provide the possible root causes to each recipient via any of several electronic communications, such as email, instant message, text message, and voice call. In another example, the analysis service 328 generates a root cause analysis report, such as report 400, based on the determined root cause(s) for an outage. The analysis service 328 provides the report to an incident management system (e.g., a trouble ticketing system or service help desk portal) to enable the possible root causes to be recorded and triaged. The report may be displayed via an interface of one or more computing devices, such as via the GUI 330. In examples, the report includes information about the root cause determination, one or more of the service dependency instances, service dependencies, health statuses of service dependency instances and service dependencies, SLIs of the service dependency instances and/or the service dependencies, graphical representations of the SLIs of the service dependency instances and/or the service dependencies, and/or relationships between service dependencies and the dependent service.

Figure 4A:
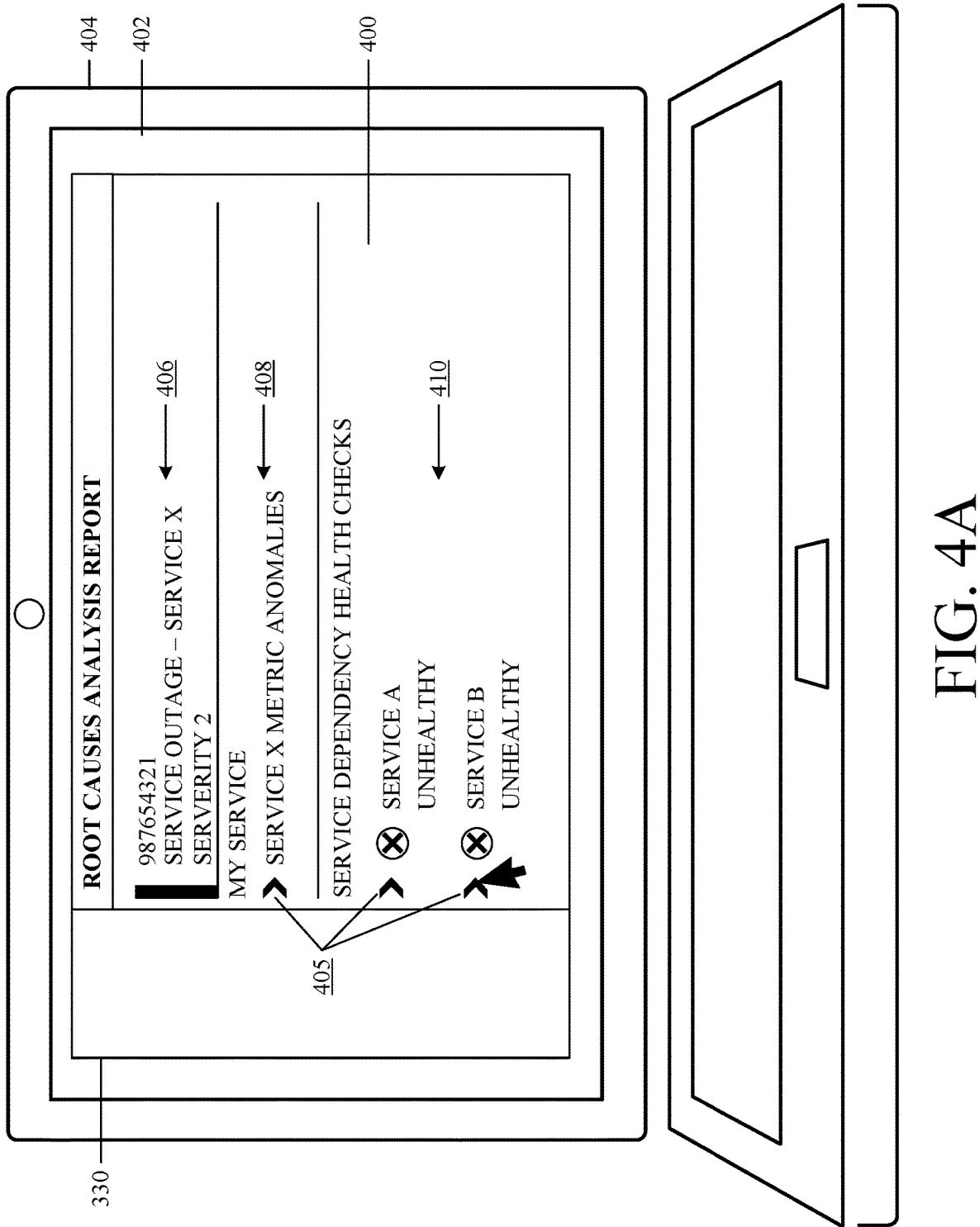
FIG. 4A and FIG. 4B illustrate an example graphical user interface including a report generated by an example outage root cause system according to one or more aspects of the present disclosure.
Figure 4B:
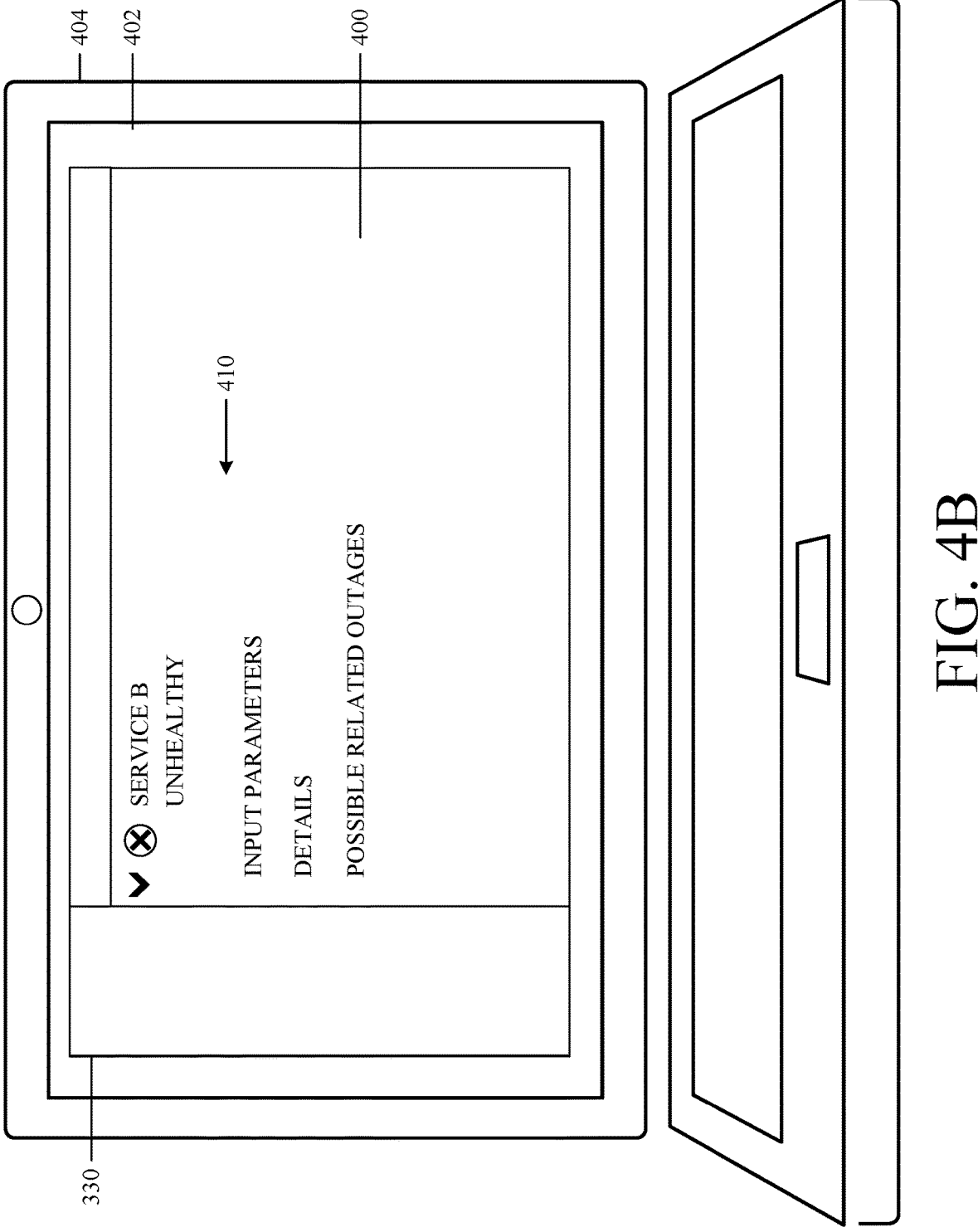

With reference now to FIGS. 4A and 4B, an example report 400 displayed via a GUI 330 on a screen 402 of a computing device 404 is depicted. As shown in FIG. 4A, the report 400 is a root cause analysis report generated by the analysis service 328 based on results of a root cause analysis of a service outage. In an example implementation, the report 400 includes outage information 406 about a detected service outage. For instance, the outage information may include an outage identifier, a name of the service detected as experiencing the outage (e.g., service X, where service X is a dependent service), and a severity level of the outage. Severity levels represent the degree to which a detected service outage has impacted the performance of a service. For instance, a first severity level may designate a slight impact to the service (e.g., a small amount of the service's functionality is impacted or unavailable), a second severity level may designate a moderate impact to the service (e.g., a moderate amount of the service's functionality is impacted or unavailable), and a third severity level may designate a severe impact to the service (e.g., a substantial amount or all of the service's functionality is impacted or unavailable).

In some examples, the report 400 further includes dependent service information 408 about the service experiencing the outage (e.g., service X). In examples, the dependent service information 408 includes metrics of the dependent service related to the detected outage. For instance, the metrics represent anomalous activity that is indicative of an outage (e.g., outlier data points, unexpected trends, elevated resource usage). In some examples, the GUI 330 includes a maximized display of information (e.g., information is not hidden or minimized). In other examples, the GUI 330 includes a subset of the information (e.g., some portion of the information is not displayed) and further includes UI elements 405 that allow a user to reveal the additional portions of the information. For instance, a user selection of a UI element 405 corresponding to the dependent service information 408 reveals additional dependent service information.

The report 400 further includes service dependency health status information 410. In examples, the service dependency health status information 410 includes a listing of service dependencies determined, by the outage root cause system 300, to be possible root causes of the outage. In further examples, the service dependency health status information 410 includes SLI health statuses of the service dependencies in the listing. For instance, the report 400 includes SLI health statuses of a first service dependency (e.g., service A) and a second service dependency (service B). The UI element 405 may be displayed proximate to minimized/additional information. When a user selection of the UI element 405 corresponding to service dependency health status information 410 is received, additional SLI health status information 410 is revealed. For instance, additional SLI health status information 410 relating to the second service dependency (service B) is displayed in the GUI 330 in FIG. 4B and includes information used and/or determined by the analysis service 328 in performing the root cause analysis of the outage. According to examples, the additional SLI health status information 410 includes a health status of the service dependency and/or service dependency instance, input parameters used in the root cause analysis (e.g., an outage identifier, date/time information), information relating to the service dependency and/or service dependency instance, information relating to determined possible related outages, etc. In other implementations, additional and/or alternative information is included in the report 400. Additionally, the GUI 330 may display features other than those described and is not limited to displaying the report 400 of the root cause analysis of an outage.

With reference again to FIG. 3, while the GUI 330 is illustrated as being part of the outage root cause system 300, in some examples, the GUI is external to the outage root cause system 300. In such examples, the analysis service 328 may provide the report 400 to the external GUI over one or more networks. While the outage root cause system 300 of FIG. 3 is illustrated with discrete components (e.g., services fetcher 316, dependencies fetcher 318, etc.), in some examples, one or more features are combined. For instance, in some examples, the service fetcher 316, the dependencies fetcher 318, the SLI health status fetcher 320, and/or the analysis service 328 are part of a single component and/or the services database 322 and the dependencies database 324 are a single database.

Having described various systems for leveraging the health statuses of service dependency instances to analyze the root cause of outages, this disclosure will now describe one or more methods that may be performed by such systems. In examples, method 500 is executed by a system, such as system 100 of FIG. 1 and/or the outage root cause system 300 of FIG. 3. However, method 500 is not limited to such examples. In other examples, method 500 is performed by a single device or component that integrates the functionality of the components of system 100 and/or the outage root cause system 300. In at least one aspect, method 500 is performed by one or more components of a distributed network, such as a web service or a distributed network service (e.g., cloud service).

Figure 5:
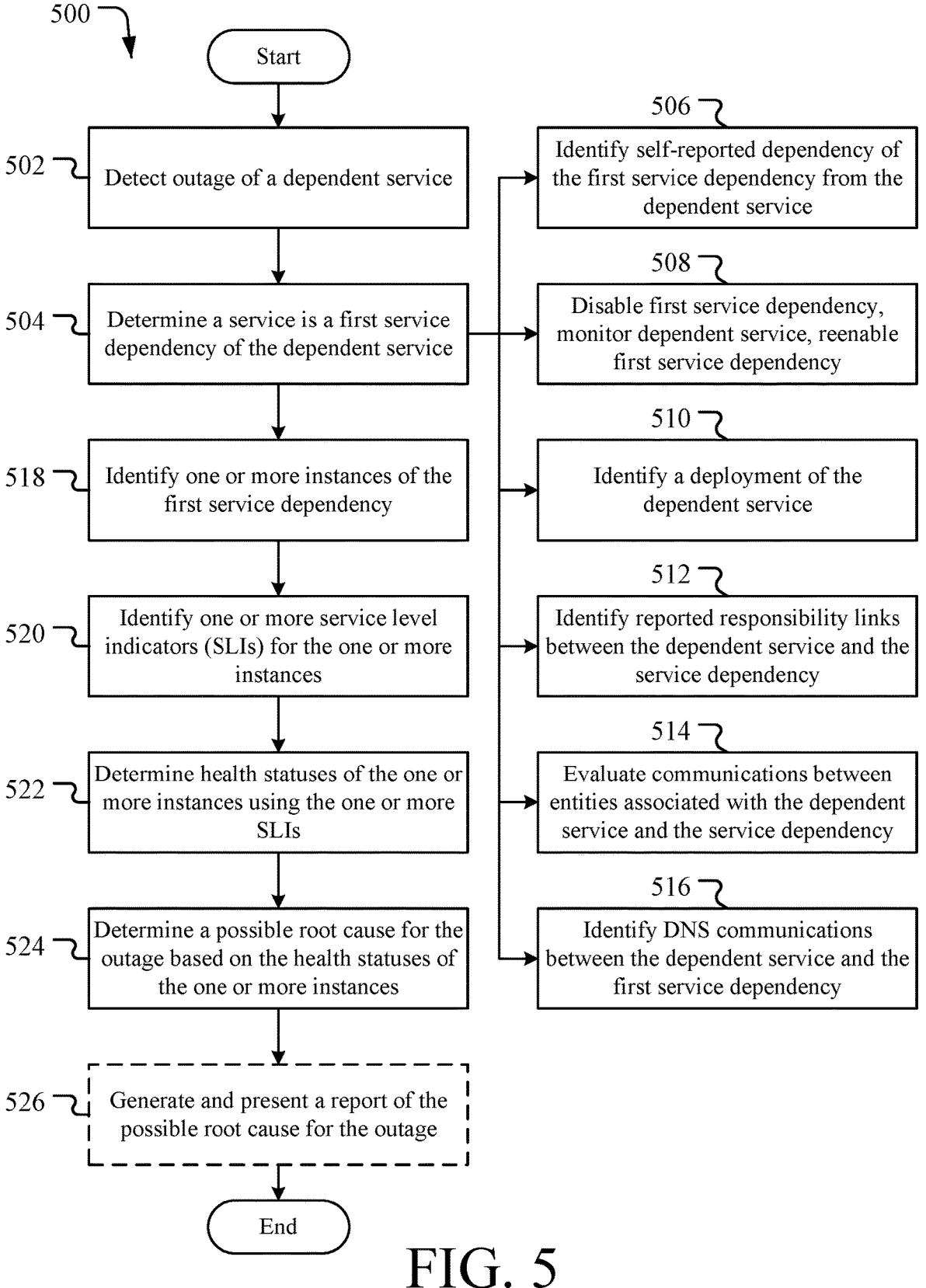
FIG. 5 illustrates an example method for determining an analysis of a root cause for an outage of a dependent service according to one or more aspects of the present disclosure.

FIG. 5 illustrates an example method for determining a root cause for an outage of a dependent service according to one or more aspects of the present disclosure. Example method 500 begins at operation 502 where an outage experienced by a dependent service is detected. In some examples, a computing system (e.g., outage root cause system 300) detects the outage of the dependent service. In other examples, components or systems external to the computing system detect and communicate the outage to the computing system. An outage may include a failure, slowdown, or other undesirable issue such that a service (e.g., the dependent service) does not perform as intended.

At operation 504, a first service dependency is determined to have a dependency relationship with the dependent service. Determining the dependency relationship includes using one or more methods, such as the methods described in operations 506-516. Although specific methods of determining the dependency relationship are discussed herein, alternative methods are contemplated.

Operation 506 includes identifying one or more self-reported dependencies of the dependent service. Self-reported dependencies may be reported by the dependent service or by an entity associated with the dependent service (e.g., a service owner or administrator). As one example, the dependent service reports a list of its service dependencies to the computing system as part of an automated task executed by the dependent service. The automated task may be executed at specific time intervals (e.g., periodically or continuously) or upon demand (e.g., in response to a request to report the service dependencies). Alternatively, the entity associated with the dependent service manually reports the list of service dependencies to the computing system or to a data repository accessible to the computing system.

Operation 508 includes performing a scream test for one or more service dependencies. In examples, the scream test comprises disabling the first service dependency and monitoring the dependent service to determine whether the dependent service experiences issues (e.g., impacted service or network performance) or generates notifications (e.g., warnings or alerts) associated with disabling the first service dependency. The scream test may further comprise reenabling the first service dependency after a time interval has elapsed to further monitor the dependent service in order to determine whether the dependent service continues to (or begins to) experience issues or generate notifications.

Operation 510 includes identifying a deployment of the dependent service. Identifying the deployment includes evaluating the dependent service's configuration, codebase, integrations, etc., to determine the service dependencies of the dependent service. For example, the evaluation may include analyzing code libraries, frameworks, or other software resources that are explicitly defined or referenced in source code, development documentation, configuration files, and/or installation logs that are associated with the deployment. The explicitly defined or referenced code libraries, frameworks, or other software resources may indicate dependency relationships of the dependent service. For instance, a source code file may explicitly define a text processing service that is a service dependency of the dependent service.

Operation 512 includes identifying reported responsibility links between the dependent service and the first service dependency. A responsibility link refers to an explicit statement or indication that a first service is responsible for an outage that impacted a second service. In examples, identifying the responsibility links includes querying a historical outage repository, such as outages database 332, for outage relationship information between the dependent service and the first service dependency. For instance, the outage relationship information may indicate that a first service impacted by a previous outage caused a second service to be negatively impacted. Based on the causal impact by the first service on the second service, it may be determined that the first service is a service dependency of the second service. In some examples, determining the responsibility links further includes evaluating whether the first and second services were impacted at or around the same time period, the severity of the impact to the services, and the type of impact experienced by the services, among other considerations.

Operation 514 includes evaluating communications by or between one or more entities associated with the dependent service and the service dependency. For example, a first owner of the dependent service may communicate to a second owner of the service dependency a request for assistance with the operation of the dependent service. In response to the request for assistance, the second owner may communicate to the first owner instructions for correcting the outage or indicate a set of corrective actions that will be performed by the second owner. Based on the communications between the first and second owners, a determination is made regarding a dependency relationship between the dependent service and the first service dependency. For instance, the determination may be based on specific language in the communications (e.g., "request for assistance"), the presence of remedial instructions, a sequential order of communications between the entities (e.g., the entity that initiates the communication dialogue may be determined to be the owner of the dependent service), or a frequency of communication by or between the entities.

Operation 516 includes identifying DNS communications between the dependent service and the first service dependency. In an example, the dependent service provides a DNS request to the first service dependency to request the service dependency to perform a function that assists the dependent service in the fulfillment of a task. For instance, in response to the dependent service receiving a request to convert content from a first language to a second language, the dependent service sends the service dependency a DNS request that requests the service dependency to performs NLP on the received content. Based on the transmission direction of the DNS requests (e.g., from the dependent service to the service dependency) or the volume disparity between the number of DNS requests received by each of the dependent service and the service dependency, a determination is made regarding a dependency relationship between the dependent service and the first service dependency. For instance, because a first service sends more DNS requests to a second service than it receives from the service, the first service may be determined to be a dependent service.

At operation 518, one or more service dependency instances of the first service dependency are identified. Identifying the service dependency instances comprises accessing a data store, such as services database 322 or dependencies database 324. For example, the data store may store each service dependency instance associated with the dependent service in addition to other information associated with each instance (e.g., metrics, dependencies, owners). In some examples, the service dependency instances are distributed across multiple computing resources in different physical locations. In other examples, the service dependency instances are located in a single computing resource or in a single physical location. The service dependency instances provide functionality to the dependent service. The functionality provided by each service dependency instance may differ or be limited based on attributes of the user or computing environment associated with the service dependency instance. In examples, enabling creation of the service dependency instances enables the first service dependency to scale to meet demand, distribute a workload efficiently, etc.

At operation 520, one or more SLIs for each of the service dependency instances of the first service dependency are identified. An SLI includes any type of information regarding a service dependency instance, such as availability, latency, success or error rate of data transmissions, throughput, data response time, and computing resource usage. For example, a first SLI may indicate the average CPU usage (e.g., 75% usage) for a service dependency instance over a time interval, a second SLI may indicate an average response time (e.g., 250 ms) for a service dependency instance to respond to data requests over a time interval, a third SLI may indicate an availability (e.g., 95% uptime) of a service dependency instance over a time interval, and a fourth SLI may indicate a total number of DNS requests (e.g., 1,000 requests) received by a service dependency instance over a time interval. In some examples, the SLIs are identified by querying the first service dependency or the service dependency instances of the first service dependency for the SLIs. In other examples, the SLIs are identified by accessing one or more data sources comprising stored SLIs (e.g., performance logs or service health data).

At operation 522, a health status of each of the service dependency instances of the first service dependency is determined using the identified SLIs. In examples, each SLI is associated with one or more thresholds that are used to determine the health status of a service dependency instance. For instance, a threshold of 95% availability may indicate that a service dependency instance is unhealthy if the service dependency instance is availability less than 95% of a time interval (e.g., one week). In some examples, the health status of a service dependency instance is determined based on a single SLI or a subset of SLIs of a plurality of SLIs identified for the service dependency instance. For example, if one SLI in a group of five SLIs indicates that the health status of a service dependency instance is unhealthy and the remaining four SLIs in the group of SLIs indicates that the health status of the service dependency instance is healthy, the health status of the service dependency instance may be determined to be unhealthy. Alternatively, if less than a majority of the SLIs in the group of SLIs indicate the health status of the service dependency instance is unhealthy, the health status of the service dependency instance may be determined to be healthy.

At operation 524, a root cause for the outage of the dependent service is determined based on the health statuses of the service dependency instances of the first service dependency. For example, a specific service dependency instance may be determined to be unhealthy, as discussed above. Based on the health status of the specific service dependency instance, the service dependency instance may be determined to be the root cause (or a possible root cause) of the outage. In some examples, multiple possible root causes are determined based on the health statuses of the service dependency instances. For example, if multiple service dependency instances are determined to be unhealthy, each of the multiple service dependency instances may be determined to be a possible root cause of the outage. The multiple service dependency instances may be ranked and presented according to a confidence score assigned to each of the multiple service dependency instances. For example, the multiple service dependency instances may be arranged in descending order according to respectively assigned confidence scores such that the service dependency instance that is determined to be the most likely root cause of the outage is ranked and presented highest in a list of the multiple service dependency instances.

In some examples, determining a root cause for the outage further includes comparing a region of the dependent service with a region of an unhealthy service dependency instance. For instance, if a region of the dependent service and a region of an unhealthy service dependency instance are determined to be physically separated by at least a threshold distance (e.g., 500 miles), the unhealthy service dependency instance may be excluded as a possible root cause of the outage. In other examples, determining a root cause for the outage further or alternatively includes comparing a time of the outage with a time interval during which a service dependency instance is determined to be unhealthy. For instance, if the outage and the time interval during which the service dependency instance is determined to be unhealthy did not occur within a threshold amount of time (e.g., concurrently or within two minutes of each other), the service dependency instance may be excluded as a possible root cause of the outage.

At optional operation 526, a report of one or more possible root causes is generated and presented to a user via a GUI associated with the computing system. The report may include information related to the outage (e.g., date/time of the outage, duration of the outage, impact of the outage), one or more dependency relationships between the first service dependency and the dependent service, information used to determine the dependency relationship(s), one or more service dependency instances of the first service dependency, SLIs associated with the service dependency instances, health statuses of the service dependency instances, information used to determine the health statuses (e.g., thresholds and SLAs), one or more root cause predictions, confidence scores associated with each root cause prediction, and recommended corrective actions (e.g., contact a specific person or group, reboot a server or service, execute an antivirus scan, implement a specific security procedure).

Figure 6:
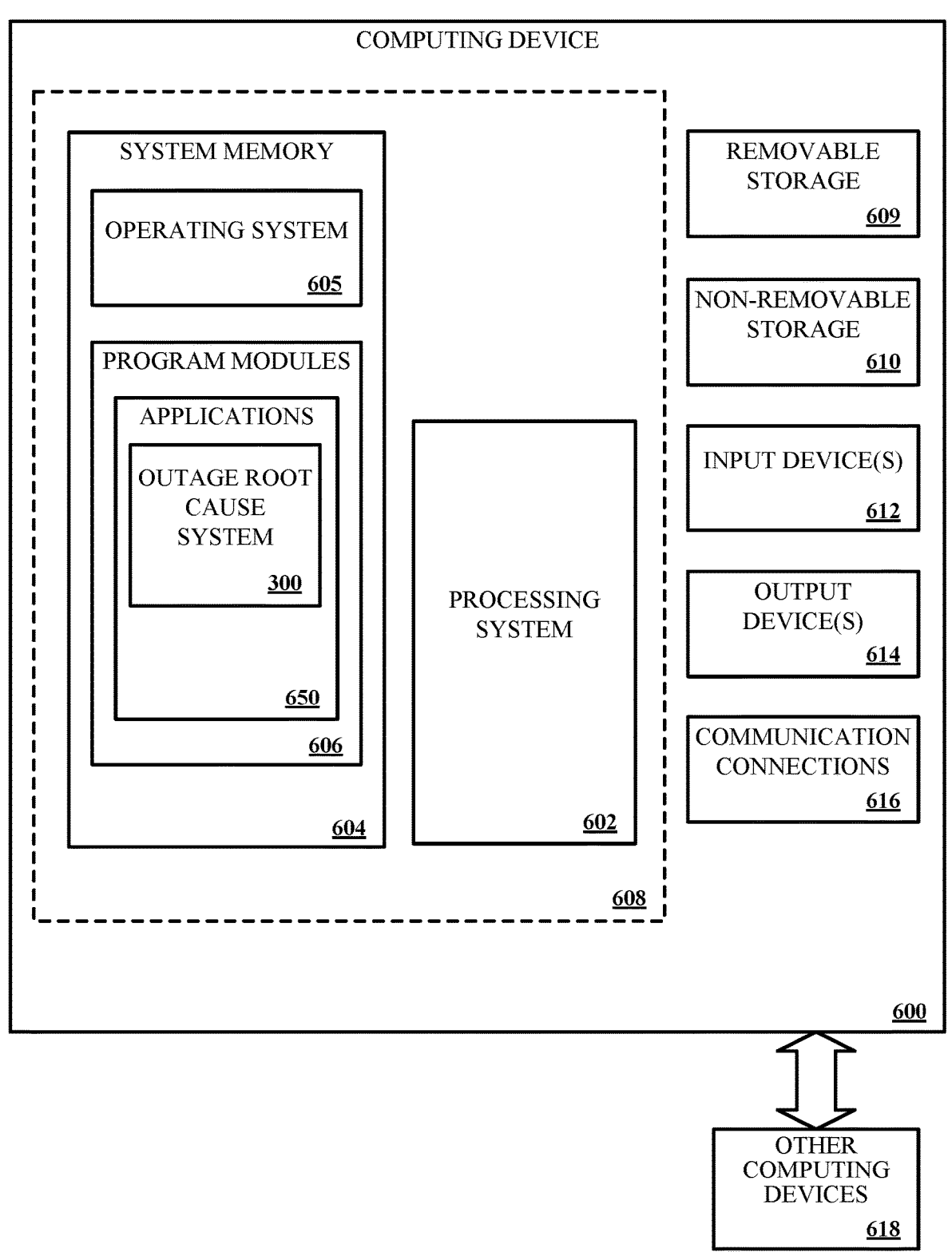
FIG. 6 is a block diagram illustrating example physical components of a computing device with which aspects of the disclosure may be practiced.
Figure 7:
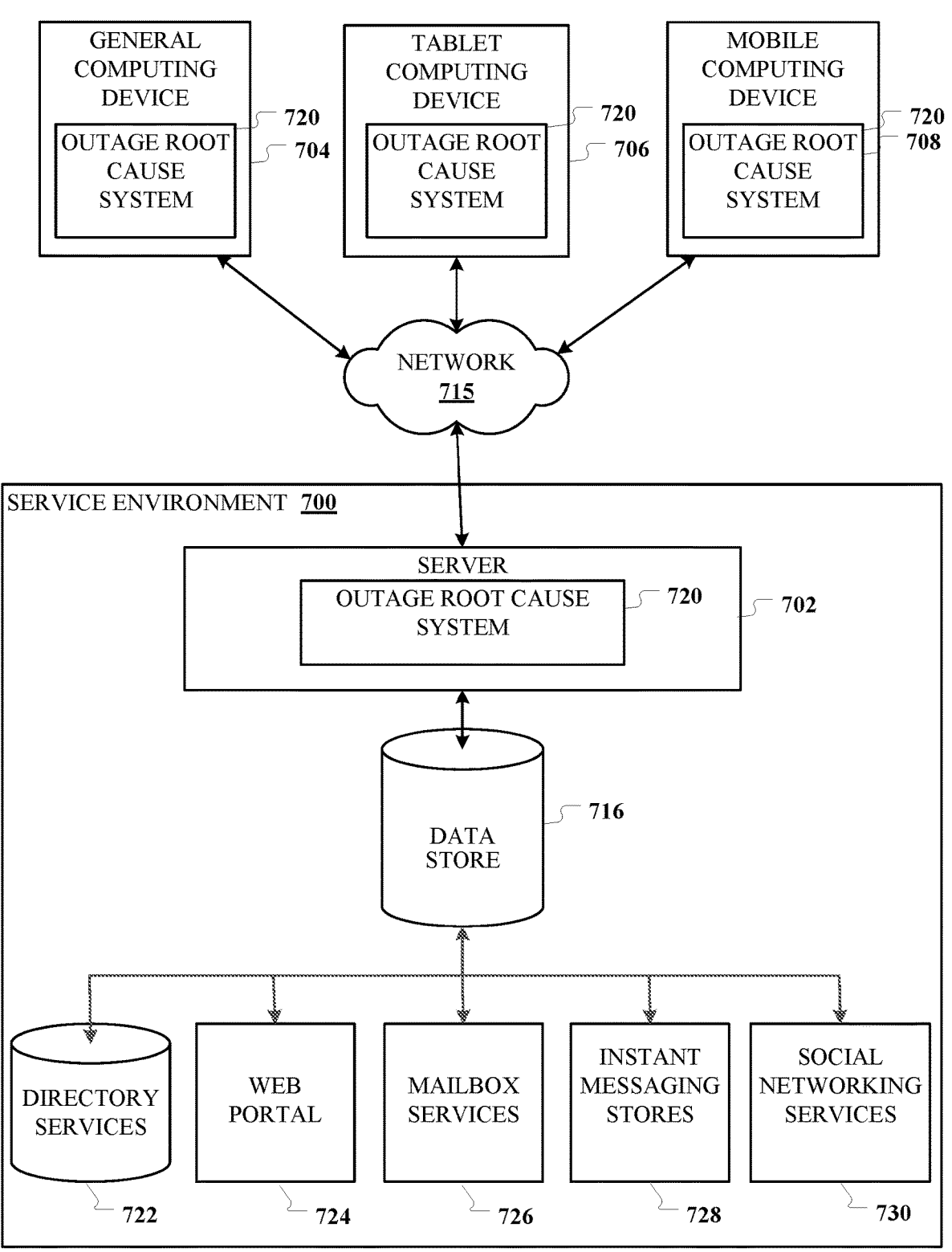
FIG. 7 is a simplified block diagram of a distributed computing system in which aspects of the present disclosure may be practiced.

FIGS. 6-7 and the associated descriptions provide a discussion of a variety of operating environments in which aspects of the disclosure may be practiced. However, the devices and systems illustrated and discussed with respect to FIGS. 6-7 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices and systems described above. In a basic configuration, the computing device 600 may include at least one processing system 602 and a system memory 604. Depending on the configuration and type of computing device, the system memory 604 may comprise volatile storage (e.g., random access memory (RAM)), non-volatile storage (e.g., read-only memory (ROM)), flash memory, or any combination of such memories.

The system memory 604 may include an operating system 605 and one or more program modules 606 suitable for running software application 620, such as one or more components supported by the systems described herein. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks or optical disks. Such additional storage is illustrated in FIG. 6 by a removable storage device 609 and a non-removable storage device 610.

As stated above, a number of program modules and data files may be stored in the system memory 604. While executing on the processing system 602, the program modules 606 (e.g., application 620, outage root cause system 300) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing systems/units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 640. Examples of suitable communication connections 616 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, compact disk (CD)-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

An outage root cause system 720 may be employed by a client that communicates with server device 702, and/or outage rot cause system 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

As will be understood from the present disclosure, one example of the technology discussed herein relates to a system comprising: a processing system; and memory coupled to the processing system, the memory comprising computer executable instructions that, when executed, perform operations comprising: identifying an outage of a dependent service; determining a first service dependency of the dependent service; identifying an instance of the first service dependency; identifying a service level indicator (SLI) for the instance of the first service dependency; determining a health status of the instance of the first service dependency based on the SLI; and determining a root cause for the outage based on the health status.

In another example, the technology discussed herein relates to a computer-implemented method comprising: determining a first service dependency of a dependent service; identifying multiple instances of the first service dependency; identifying service level indicators (SLIs) for the multiple instances; determining health statuses for the multiple instances based on the SLIs; and determining a root cause for a service-impacting event experienced by the dependent service based on the health statuses of the multiple instances.

In another example, the technology discussed herein relates to a device comprising: a processing system; and memory comprising computer executable instructions that, when executed, perform operations comprising: determining a first service dependency of a dependent service; identifying an instance of the first service dependency; collecting a service level indicator (SLI) for the instance of the first service dependency; determining a health status of the instance of the first service dependency based on the SLI; determining a possible root cause for a service-impacting event experienced by the dependent service based on the health status of the instance of the first service dependency; and displaying, via a graphical user interface (GUI), reporting the possible root cause for the service-impacting event.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processing system; and
memory coupled to the processing system, the memory comprising computer executable instructions that, when executed, perform operations comprising:
identifying an outage of a dependent service;
determining a first service dependency of the dependent service by disabling the first service dependency and identifying a notification indicating the first service dependency has been disabled;
identifying an instance of the first service dependency;
identifying a service level indicator (SLI) for the instance of the first service dependency;

determining a health status of the instance of the first service dependency based on the SLI; and
determining a root cause for the outage based on the health status.

2. The system of claim 1, wherein determining the first service dependency comprises identifying a self-reported dependency reported by the dependent service.

3. The system of claim 1, wherein determining the first service dependency comprises:
disabling the first service dependency;
monitoring the dependent service for issues or a notification associated with disabling the first service dependency; and
determining the first service dependency based on the issues or notification.

4. The system of claim 1, wherein determining the first service dependency comprises:
identifying a deployment of the dependent service;
analyzing configuration information associated with the deployment; and
determining the first service dependency based on the configuration information.

5. The system of claim 1, wherein determining the first service dependency comprises:
identifying a responsibility link between the dependent service and the first service dependency, the responsibility link indicating that one of the dependent service or the first service dependency was previously responsible for impacting the other of the dependent service or the first service dependency; and
determining the first service dependency based on the responsibility link.

6. The system of claim 1, wherein determining the first service dependency comprises:
evaluating a communication between a first entity associated with the dependent service and a second entity associated with the first service dependency; and
determining the first service dependency based on the communication.

7. The system of claim 1, wherein determining the first service dependency comprises:
identifying DNS communications between the dependent service and the first service dependency; and
determining the first service dependency based on the DNS communications.

8. The system of claim 1, the operations further comprising:
displaying, via a graphical user interface (GUI), the root cause and at least one of:
the health status of the instance of the first service dependency; or
the SLI.

9. The system of claim 1, the operations further comprising:
determining a second service dependency of the dependent service;
identifying an instance of the second service dependency by accessing a service provider of the second service dependency;
identifying an SLI for the instance of the second service dependency; and
determining a health status of the instance of the second service dependency;
wherein determining the root cause is further based on the health status of the instance of the second service dependency.

10. The system of claim 9, determining the first service dependency comprises weighting the first service dependency based on at least one of:

a self-reported dependency;

a scream test dependency;

a deployment dependency;

a responsibility link dependency;

a communication dependency; or a DNS communications dependency.

11. The system of claim 9, wherein determining a root cause comprises:

determining a first region of the dependent service;

determining second region of the first service dependency;

determining whether the first region is physically separated from the second region by a threshold distance; and if it is determined that the first region is physically separated from the second region by the threshold distance, excluding the first service dependency from being the root cause.

12. A computer-implemented method comprising:

determining a first service dependency of a dependent service by disabling the first service dependency and identifying a notification indicating the first service dependency has been disabled;

identifying multiple instances of the first service dependency;

identifying service level indicators (SLIs) for the multiple instances;

determining health statuses for the multiple instances based on the SLIs; and determining a root cause for an outage experienced by the dependent service based on the health statuses of the multiple instances.

13. The method of claim 12, wherein the SLIs comprise at least one of:

an availability of the first service dependency, data response items of the first service dependency; or computing resource usage of the first service dependency.

14. The method of claim 12, wherein determining the health statuses comprises:

comparing each of the SLIs to a respective threshold; and determining a corresponding health status of an instance of the multiple instances is unhealthy based on an SLI for the instance being below the respective threshold.

15. The method of claim 12, wherein determining the health statuses further comprises:

comparing each of the SLIs to a respective threshold; and determining a corresponding health status of an instance of the multiple instances is healthy based on an SLI for the instance being at or above the respective threshold.

16. The method of claim 12, wherein the SLIs are received from the first service dependency periodically and stored in a data store comprising historical SLIs for the first service dependency.

17. A device comprising:

a processing system; and memory coupled to the processing system, the memory comprising computer executable instructions that, when executed, perform operations comprising:

determining a first service dependency of a dependent service by disabling the first service dependency and identifying a notification indicating the first service dependency has been disabled;

identifying an instance of the first service dependency;

collecting a service level indicator (SLI) for the instance of the first service dependency;

determining a health status of the instance of the first service dependency based on the SLI;

determining a root cause for an outage experienced by the dependent service based on the health status of the instance of the first service dependency; and reporting the root cause for the outage.

18. The device of claim 17, wherein reporting the possible root cause for the outage comprises generating a report comprising the instance of the first service dependency and the health status of the instance of the first service dependency.

19. The device of claim 17, the operations further comprising:

determining a second service dependency of the first service dependency; and storing, in a database, a dependency relationship between the first service dependency and the second service dependency.

20. The device of claim 19, wherein the dependency relationship indicates:

a first relationship between the first service dependency and the dependent service; and a second relationship between the second service dependency and the dependent service.

* * * * *